US010509999B2

(12) United States Patent
Lee (10) Patent No.: US 10,509,999 B2
(45) Date of Patent: Dec. 17, 2019

(54) NEUROMORPHIC DEVICE INCLUDING POST-SYNAPTIC NEURONS HAVING A COMPARATOR FOR DECIDING QUASI-LEARNED SYNAPSES

(71) Applicant: SK hynix Inc., Icheon (KR)

(72) Inventor: Hyung-Dong Lee, Icheon (KR)

(73) Assignee: SK HYNIX INC., Icheon (KR)

(*) Notice: Subject to any disclaimer, the term of this patent is extended or adjusted under 35 U.S.C. 154(b) by 476 days.

(21) Appl. No.: 15/385,309

(22) Filed: Dec. 20, 2016

(65) Prior Publication Data
US 2017/0193353 A1 Jul. 6, 2017

Related U.S. Application Data

(60) Provisional application No. 62/273,311, filed on Dec. 30, 2015.

(30) Foreign Application Priority Data

Sep. 20, 2016 (KR) .................. 10-2016-0119785

(51) Int. Cl.
  *G06N 3/063* (2006.01)
(52) U.S. Cl.
  CPC .................. *G06N 3/0635* (2013.01)

(58) Field of Classification Search
  CPC .................. G06N 3/0635; G06N 3/049
  See application file for complete search history.

(56) References Cited

U.S. PATENT DOCUMENTS

| 5,671,337 A | 9/1997 | Yoshihara | |
|---|---|---|---|
| 2005/0015351 A1* | 1/2005 | Nugent | G06N 3/063 706/33 |
| 2010/0081958 A1* | 4/2010 | She | A61B 5/0031 600/544 |
| 2018/0089557 A1* | 3/2018 | Kumar | G06N 3/049 |

FOREIGN PATENT DOCUMENTS

KR        101512370 B1 *  4/2015   ........... G06N 3/0635

* cited by examiner

*Primary Examiner* — Austin Hicks (57) ABSTRACT

A neuromorphic device may include: a pre-synaptic neuron; a plurality of post-synaptic neurons; and a plurality of synapses electrically connected to the pre-synaptic neuron and electrically connected to the plurality of post-synaptic neurons. Each of the post-synaptic neurons may include: an integrator; a main comparator having a first input port connected to an output port of the integrator; and a first sub comparator having a first input port connected to the output port of the integrator.

10 Claims, 11 Drawing Sheets

NEUROMORPHIC DEVICE INCLUDING POST-SYNAPTIC NEURONS HAVING A COMPARATOR FOR DECIDING QUASI-LEARNED SYNAPSES

CROSS-REFERENCE TO RELATED APPLICATIONS

The present application claims priorities of U.S. Provisional Patent Application No. 62/273,311, filed on Dec. 30, 2015, and Korean Patent Application No. 10-2016-0119785, filed on Sep. 20, 2016, which are incorporated herein by reference in its entirety.

BACKGROUND

1. Field

Exemplary embodiments of the present disclosure relate to a neuromorphic device, and more particularly, to a neuromorphic device including post-synaptic neurons having comparators for deciding and resetting quasi-learned synapses.

2. Description of the Related Art

Recently, much attention has been paid to neuromorphic technology using chips that mimic the human brain. A neuromorphic device used in the neuromorphic technology includes a plurality of pre-synaptic neurons, a plurality of post-synaptic neurons, and a plurality of synapses. The neuromorphic device outputs pulses or spikes depending on a variety of levels, amplitudes, or times, according to learned states.

In a learning mode, untrained synapses, among the synapses of the neuromorphic device, may be quasi-trained. In this case, when a learned data pattern is read out from the neuromorphic device, a data pattern similar to the learned data pattern may be outputted from the quasi-trained synapses. At this time, the neuromorphic device may malfunction. Therefore, the quasi-trained synapses need to be reset to an initial state in which the synapses are not trained.

SUMMARY

Various embodiments are directed to a neuromorphic device capable of deciding quasi-learned synapses.

Also, various embodiments are directed to a neuromorphic device capable of resetting quasi-learned synapses.

Also, various embodiments are directed to a neuromorphic device including post-synaptic neurons having a plurality of comparators for deciding quasi-learned synapses.

Also, various embodiments are directed to a method for deciding quasi-learned synapses in a neuromorphic device.

Also, various embodiments are directed to a method for resetting quasi-learned synapses in a neuromorphic device.

In an embodiment, a neuromorphic device may include: a pre-synaptic neuron; a plurality of post-synaptic neurons; and a plurality of synapses electrically connected to the pre-synaptic neuron and electrically connected to the plurality of post-synaptic neurons. Each of the post-synaptic neurons may include an integrator; a main comparator having a first input port connected to an output port of the integrator; and a first sub comparator having a first input port connected to the output port of the integrator.

The main comparator may have a second input port receiving a main reference voltage.

The first sub comparator may have a second input port receiving a first sub reference voltage.

The neuromorphic device may further include a second sub comparator having a first input port connected to the output port of the integrator and a second input port receiving a second sub reference voltage.

The main reference voltage may have a higher voltage level than the first and second sub reference voltage levels, and the second sub reference voltage may have lower voltage level than the first sub reference voltage level.

The first input ports of the main comparator, the first sub comparator, and the second sub comparator may be non-inverting input ports, and the second input ports of the main comparator, the first sub comparator and the second sub comparator may be inverting input ports.

The output port of the integrator, the first input port of the main comparator, and the first input port of the first sub comparator may be directly connected to each other.

The input ports of the integrators of the plurality of post-synaptic neurons may be electrically connected to the plurality of synapses, respectively.

The neuromorphic device may further include a switch block disposed between the plurality of post-synaptic neurons and the plurality of synapses.

The switch block may include a plurality of switches. The plurality of synapses may be grouped into a plurality of column line bundles. The plurality of switches may electrically connect or disconnect a corresponding one of the column line bundles to or from the integrators of the plurality of post-synaptic neurons.

In an embodiment, a neuromorphic device may include: a pre-synaptic neuron; a row line electrically connected to the pre-synaptic neuron; a plurality of post-synaptic neurons; a plurality of column lines electrically connected to the plurality of post-synaptic neurons, respectively; and a plurality of synapses arranged at intersections between the low line and the plurality of column lines. Each of the plurality of post-synaptic neurons may include: an integrator; and a comparator having a first input port connected to an output port of the integrator. The comparator may have a second input port to which a main reference voltage and a sub reference voltage are inputted. The sub reference voltage having a lower voltage level than the main reference voltage level.

The sub reference voltage may have two or more different voltage levels.

The integrators of the plurality of post-synaptic neurons may include input ports electrically connected to the plurality of synapses, respectively.

In an embodiment, there is provided a method for learning a synapse of a neuromorphic device, using a post-synaptic neuron which has an integrator, a main comparator and a first sub comparator, wherein the main comparator and the first sub comparator have input ports electrically connected to an output port of the integrator. The method may include: receiving, by the integrator, an electrical signal from the synapse through a column line; and depressing the synapse if the integrator outputs, based on the electrical signal from the synapse, an electrical signal having a voltage level that is lower than a voltage level of a main reference voltage and higher than a voltage level of a first sub reference voltage level, the main reference voltage being provided to the main comparator, the first sub reference voltage being provided to the first sub comparator.

The main reference voltage may have a higher voltage level than the first sub reference voltage.

In an embodiment, there is provided a method for learning a synapse of a neuromorphic device, using a post-synaptic neuron which has an integrator, a main comparator, and first and second sub comparators, wherein the main comparator and the first and second sub comparators have first input ports electrically connected to an output port of the integrator, the main comparator includes a second input port for receiving a main reference voltage, the first sub comparator includes a second input port for receiving a first sub reference voltage having a lower voltage level than the main reference voltage level, and the second sub comparator includes a second input port that receives a second sub reference voltage having a lower voltage level than the first sub reference voltage. The method may include: receiving, by the integrator, an electrical signal from the synapse through a column line when a learning operation on the synapse is complete; and depressing the synapse by performing a primary reset process when the integrator outputs, based on the electrical signal from the synapse, an electrical signal having a voltage level that is lower than a voltage level of the main reference voltage and higher than the voltage levels of the first and second sub reference voltages.

The method may further include depressing the synapses by performing a secondary reset process, when the integrator outputs an electrical signal having a voltage level that is lower than the voltage levels of the main reference voltage and the first sub reference voltage, the electrical signal output by the integrator being higher than the voltage levels of the second sub reference voltage.

In an embodiment, there is provided a method for learning synapses of a neuromorphic device which includes a first post-synaptic neuron connected to a first synapse and a second post-synaptic neuron connected to a second synapse. The method may include: performing a learning process including training the first and second synapses; and when the first post-synaptic neuron is fired and the second post-synaptic neuron is not fired as a result of the learning process, depressing, by the second post synaptic neuron, the second synapse.

Each of the first and second post-synaptic neurons may include: an integrator having an input port electrically connected to the corresponding synapse; and a main comparator and one or more sub comparators having first input ports connected to an output port of the integrator, when the first post-synaptic neuron is fired and the second post-synaptic neuron is not fired as a result of the learning process, the second synapse is depressed by fired sub comparators in the second post-synaptic neuron.

A main reference voltage provided to the main comparator may have a higher voltage level than one or more sub reference voltage levels provided to the one or more sub comparators, respectively.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Terms used in this specification are used for describing various embodiments, and do not limit the present invention. The terms of a singular form may include plural forms unless referred to the contrary. The meaning of 'comprise' or 'comprising' used in the specification specifies a component, step, operation, and/or element, but does not exclude other components, steps, operations, and/or elements.

When one element is referred to as being 'connected to' or 'coupled to' another element, it may indicate that the former element is directly connected or coupled to the latter element or another element is interposed therebetween. On the other hand, when one element is referred to as being 'directly connected to' or 'directly coupled to' another element, it may indicate that no element is interposed therebetween. Furthermore, 'and/or' includes each of described items and one or more combinations.

The terms such as 'below', 'beneath', 'lower', 'above' and 'upper', which are spatially relative terms, may be used to describe the correlation between one element or components and another element or other components, as illustrated in the drawings. The spatially relative terms should be understood as terms including different directions of elements during the use or operation, in addition to the directions illustrated in the drawings. For example, when an element illustrated in a drawing is turned over, the element which is referred to as being 'below' or 'beneath' another element may be positioned above another element.

Throughout the specification, like reference numerals refer to like elements. Therefore, although the same or similar reference numerals are not mentioned or described in a corresponding drawing, the reference numerals may be described with reference to other drawings. Furthermore, although elements are not represented by reference numerals, the elements may be described with reference to other drawings.

In this specification, 'potentiation', 'set', 'training', and 'learning' may be used as the same or similar terms, and 'depressing', 'reset', and 'initiation' may be used as the same or similar terms. For example, an operation of lowering resistance values of synapses may be exemplified as potentiation, setting, or learning, and an operation of raising the resistance values of synapses may be exemplified as depressing, resetting, or initiation. Furthermore, when a synapse is potentiated, set, trained, or learned, a gradually increasing voltage/current may be outputted from the synapse because the conductivity of the synapse is increased. When a synapse is depressed, reset, or initiated, a gradually decreasing voltage/current may be outputted from the synapse because the conductivity of the synapse is decreased. For convenience of description, a data pattern, an electrical signal, a pulse, a spike, and a fire may be interpreted as having the same, similar, or compatible meaning. Furthermore, a voltage and a current may also be interpreted as having the same or compatible meaning.

Figure 1:
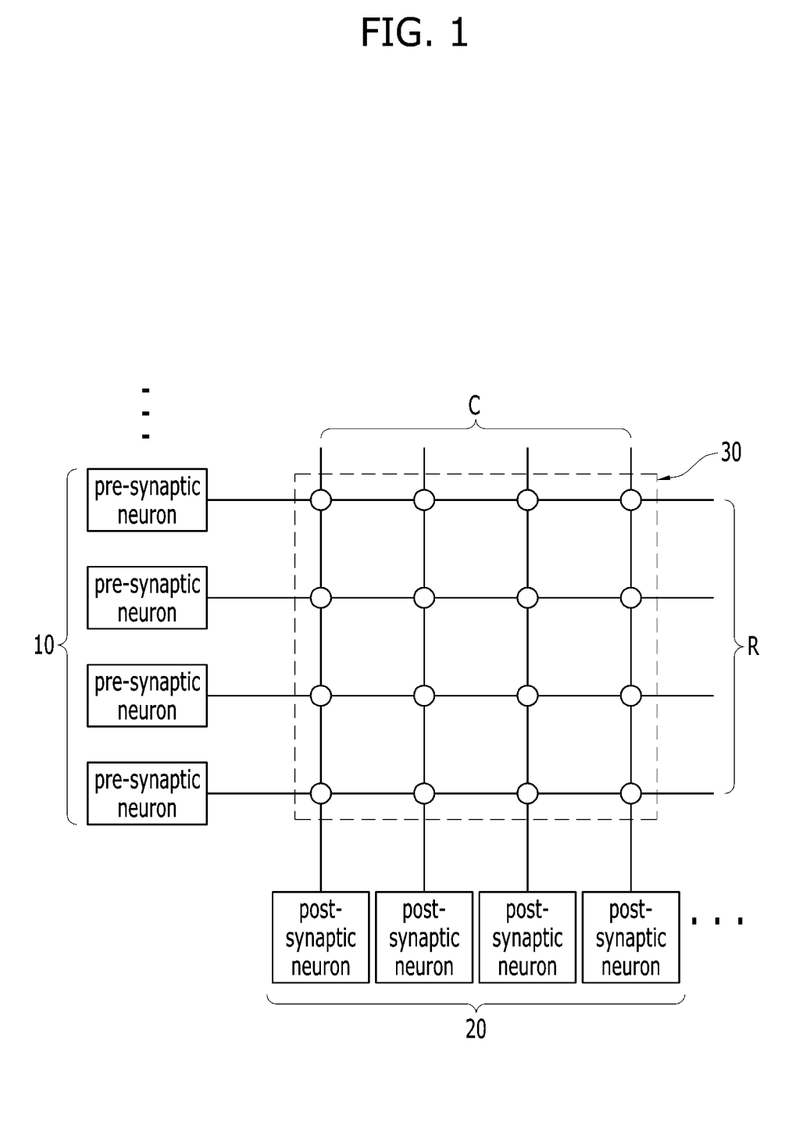
FIG. 1 is a block diagram conceptually illustrating a neuromorphic device in accordance with an embodiment.

FIG. 1 is a block diagram conceptually illustrating a neuromorphic device in accordance with an embodiment. Referring to FIG. 1, the neuromorphic device in accordance with the present embodiment may include a plurality of pre-synaptic neurons 10, a plurality of post-synaptic neurons 20, and a plurality of synapses 30. The synapses 30 may be disposed at the respective intersections between row lines R extending from the pre-synaptic neurons 10 and column lines C extending from the post-synaptic neurons 20. For illustrative convenience, FIG. 1 illustrates four pre-synaptic neurons 10 and four post-synaptic neurons 20.

The pre-synaptic neurons 10 may transmit electrical signals to the synapses 30 through the row lines R in a learning mode, a reset mode, or a reading mode.

The post-synaptic neurons 20 may transmit electrical signals to the synapses 30 through the column lines C in the learning mode or the reset mode, and may receive electrical signals from the synapses 30 through the column lines C in the reading mode. The electrical signals may be provided in the form of pulses.

The synapses 30 may include bipolar devices such as variable resistive devices. For example, each of the synapses 30 may include a first electrode electrically connected to a corresponding one of the pre-synaptic neurons 10 and a second electrode electrically connected to a corresponding one of the post-synaptic neurons 20. Each of the synapses 30 may have multiple resistance levels. The variable resistive device of the synapse 30 may include one or more of a metal oxide such as a transition metal oxide or a perovskite-based material, a phase-change material such as a chalcogenide-based material, a ferroelectric material, and a ferromagnetic material. Each of the synapses 30 may be gradually changed between a high-resistance state and a low-resistance state according to the number of electrical signals inputted thereto from the corresponding pre-synaptic neuron 10 and/or the corresponding post-synaptic neuron 20, an inputting time difference between the electrical signals, and/or a voltage difference between the electrical signals.

Hereinafter, a method for learning and/or resetting the synapses 30 of the neuromorphic device in accordance with the present embodiment will be described. While and/or after the synapses 30 are trained, electrical signals outputted from the respective synapses 30 may be inputted to non-inverting input terminals of integrators. Depending on voltage levels, pulse durations, or pulsing counts of the electrical signals outputted from the synapses 30, the integrators may output electrical signals having various voltage levels.

Figure 2A:
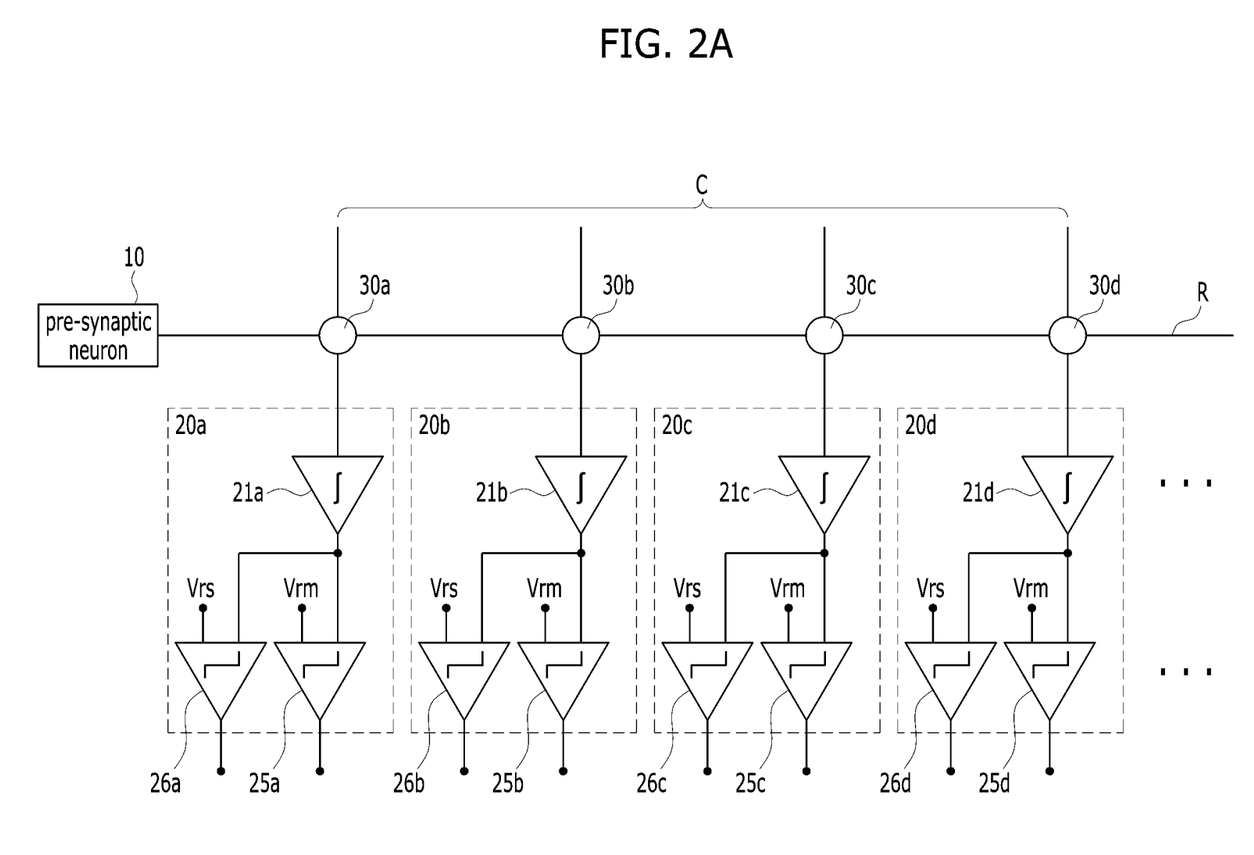
FIG. 2A is a block diagram conceptually illustrating a neuromorphic device in accordance with an embodiment.

FIG. 2A is a block diagram conceptually illustrating a neuromorphic device in accordance with an embodiment. For example, FIG. 2A illustrates one pre-synaptic neuron 10, four post-synaptic neurons 20a to 20d, and four synapses 30a to 30d. Each of the post-synaptic neurons 20a to 20d may include one integrator, one main comparator, and one or more sub comparators.

Referring to FIG. 2A, the main comparators 25a to 25d and the sub comparators 26a to 26d may be implemented as reference potential comparators.

The integrators 21a to 21d may have first input ports, for example, non-inverting input ports, which are electrically connected to the synapses 30a to 30d, respectively. Furthermore, the integrators 21a to 21d may have second input ports, for example, inverting input ports, which are connected to a reference voltage or grounded.

The respective integrators 21a to 21d may have output ports which are directly and electrically connected to first input ports, e.g., non-inverting input ports, of the respective comparators 25a to 25d and 26a to 26d. A main reference voltage Vrm may be inputted to second input ports, e.g., inverting input ports, of the main comparators 25a to 25d. A sub reference voltage Vrs may be inputted to second input ports, e.g., inverting input ports, of the sub comparators 26a to 26d. The main reference voltage Vrm and the sub reference voltage Vrs may have different positive (+) voltage levels. For example, the main reference voltage Vrm may be higher than the sub reference voltage Vrs.

When electrical signals outputted from the respective integrators 21a to 21d have higher voltage levels than the reference voltages Vrm and Vrs of the respective comparators 25a to 25d and 26a to 26d, the comparators 25a to 25d and 26a to 26d may output electrical signals.

For example, when the voltages of the electrical signals outputted from the respective integrators 21a to 21d are lower than the sub reference voltage Vrs while the synapses 30a to 30d are trained in the learning mode, the comparators 25a to 25d and 26a to 26d may output no electrical signals. A scenario in which the comparators 25a to 26d and 26a to 26d output no electrical signals may indicate that a learning operation of the synapses 30a to 30d is incomplete. Thus, the learning operation of the synapses 30a to 30d may be continued.

When the voltages of the electrical signals outputted from the respective integrators 21a to 21d are lower than the main reference voltage Vrm and higher than the sub reference voltage Vrs while the synapses 30a to 30d are trained in the learning mode, the sub comparators 26a to 26d may output electrical signals, but the main comparators 25a to 25d may output no electrical signals. A scenario in which the sub comparators 26a to 26d output the electrical signals and the main comparators 25a to 25d output no electrical signals may indicate that the synapses 30a to 30d are being trained and the learning operation is not yet complete. Thus, the learning operation of the synapses 30a to 30d may be continued. The electrical signals outputted from the sub comparators 26a to 26d may be interpreted as reset request signals.

When a voltage level of an electrical signal outputted from one of the integrators 21a to 21d connected to the firstly or dominantly trained synapse among the synapses 30a to 30d becomes higher than that of the main reference voltage Vrm while the synapses 30a to 30d are trained in the learning mode, the corresponding main and sub comparators among the main comparators 25a to 25d and the sub comparators 26a to 26d may output electrical signals.

Specifically, resistance values of the synapses 30a to 30d may be gradually lowered in the learning mode. An electrical signal outputted from the synapse having the lowest resistance value among the synapses 30a to 30d may drive the corresponding integrator among the integrators 21a to 21d to output the electrical signal having the highest voltage level. When the electrical signal outputted from the corresponding integrator among the integrators 21a to 21d becomes higher than the main reference voltage Vrm, an electrical signal may be outputted from the corresponding main comparator among the main comparators 25a to 25d. When electrical signals are outputted from the main comparators 25a to 25d, the post-synaptic neurons 20a to 20d are fired, and the learning mode may be ended. That is, when the post-synaptic neurons 20a to 20d are fired, the learning operation of the synapses 30a to 30d is completed.

In the learning mode, the electrical signals outputted from the sub comparators 26a to 26d may be used to reset or depress the synapses 30a to 30d. As described above, a scenario in which the sub comparators 26a to 26d output the electrical signals and the main comparators 25a to 25d output no electrical signals may indicate that the synapses are quasi-trained. According to the present embodiment, the method for learning and/or resetting the synapses 30a to 30d may include depressing the quasi-trained synapses 30a to 30d by inputting a reset signal to the quasi-trained synapses 30a to 30d. That is, the method may include resetting resistance values of the quasi-trained synapses 30a to 30d to initial resistance states.

One of the synapses 30a to 30d, which is connected to a fired post-synaptic neuron among the post-synaptic neurons 20a to 20d, is not reset. That is, an electrical signal generated from the sub comparator in the fired one of the post-synaptic neurons 20a to 20d may not be interpreted as a reset request signal, and may be ignored.

Figure 2B:
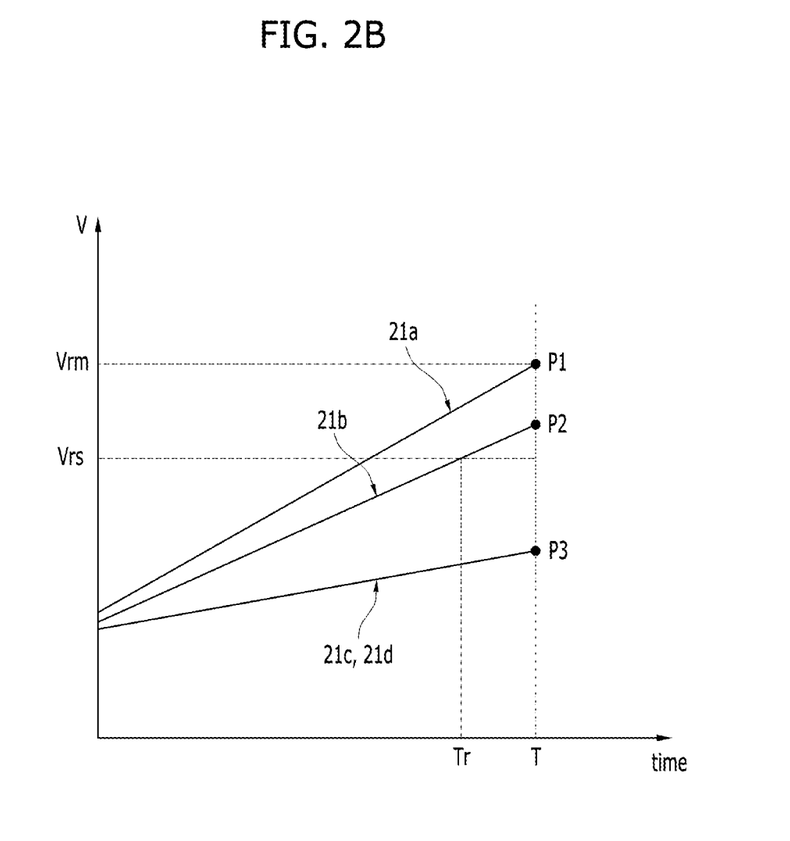
FIG. 2B is a graph conceptually illustrating changes in voltages of electrical signals outputted from integrators of post-synaptic neurons of FIG. 2A in a learning mode.

FIG. 2B is a graph conceptually illustrating changes in voltage levels of electrical signals outputted from the integrators 21a to 21d of the post-synaptic neurons 20a to 20d of FIG. 2A in the learning mode. The following descriptions presuppose that the first synapse 30a is sufficiently trained, the second synapse 30b is quasi-trained, and the third and fourth synapses 30c and 30d are not substantially trained when the learning operation is completed at a learning completion time T.

FIG. 2B shows that, in the learning mode, an electrical signal outputted from the first integrator 21a of the first post-synaptic neuron 20a, an electrical signal outputted from the second integrator 21b of the second post-synaptic neuron 20b, and electrical signals outputted from the third and fourth integrators 21c and 21d of the third and fourth post-synaptic neurons 20c and 20d may have different voltage levels, depending on the learning states of the synapses 30a to 30d. Specifically, at the learning completion time T, when the learning operation of the first synapse 30a is completed, the first integrator 21a, connected to the first synapse 30a, may output an electrical signal having a voltage level (refer to P1 in FIG. 2B) equal to or higher than the main reference voltage Vrm; the second integrator 21b, connected to the quasi-trained second synapse 30b, may output an electrical signal having a voltage level (refer to P2 in FIG. 2B) higher than the sub reference voltage Vrs and lower than the main reference voltage Vrm; and the third and fourth integrators 21c and 21d, respectively connected to the third and fourth synapses 30c and 30d that are not substantially trained, may output electrical signals having a voltage level (refer to P3 in FIG. 2B) lower than the sub reference voltage Vrs.

When the first integrator 21a of the first post-synaptic neuron 20a connected to the trained first synapse 30a outputs the electrical signal having the voltage level higher than the main reference voltage Vrm, the first post-synaptic neuron 20a may be fired by the electrical signal that is outputted from the first integrator 21a and inputted to the first main comparator 25a. That is, when the first post-synaptic neuron 20a is fired, the learning mode may be ended. In other words, the learning mode may be ended when any one of the post-synaptic neurons 20a to 20d is fired.

After the learning mode has ended at the learning completion time T, the reset mode may be performed. The reset mode may include a reset process in which the quasi-trained second synapse 30b is initiated. For example, the second sub comparator 26b in the second post-synaptic neuron 20b may output a reset request signal at a reference time Tr. After the reference time Tr, a voltage level of the electrical signal outputted from the second integrator 21b becomes higher than the sub reference voltage Vrs. In response to the reset request signal, the quasi-trained second synapse 30b is initiated and the reset process is performed after the learning completion time T. However, when it is determined at the learning completion time T that the post-synaptic neuron 20a has been fired, the synapse 30a connected to the fired post-synaptic neuron 20a is not reset in the reset process. That is, as described above, the reset request signal outputted from the sub comparator 26a of the fired post-synaptic neuron 20a may be ignored when the post-synaptic neuron 20a has been fired.

The reset process may include performing one of a first reset process and a second reset process. The first reset process may include inputting a first reset signal from the pre-synaptic neuron 10 to the second synapse 30b, and the second reset process may include inputting a second reset signal from the second post-synaptic neuron 20b to the second synapse 30b. The quasi-trained second synapse 30b may be depressed by the first reset signal and/or the second reset signal. That is, the resistance value of the quasi-trained second synapse 30b may be reset to a value close to an initial resistance level by the first reset process and/or the second reset process.

The first and/or second reset processes may not depress or reset the third and fourth synapses 30c and 30d, which have not been substantially trained. At the learning completion time T, the voltages of the electrical signals outputted from the third and fourth integrators 21c and 21d connected to the third and fourth synapses 30c and 30d, which are not substantially trained, may be lower than the sub reference voltage Vrs. Thus, the comparators 25c, 25d, 26c, and 26d of the third and fourth post-synaptic neurons 20c and 20d in FIG. 2A may output no electrical signals at the learning completion time T. Therefore, the third and fourth synapses 30c and 30d may be determined to not be substantially trained, and the first and/or second reset processes may not be performed on the third and fourth synapses 30c and 30d in the reset mode.

Figure 3A:
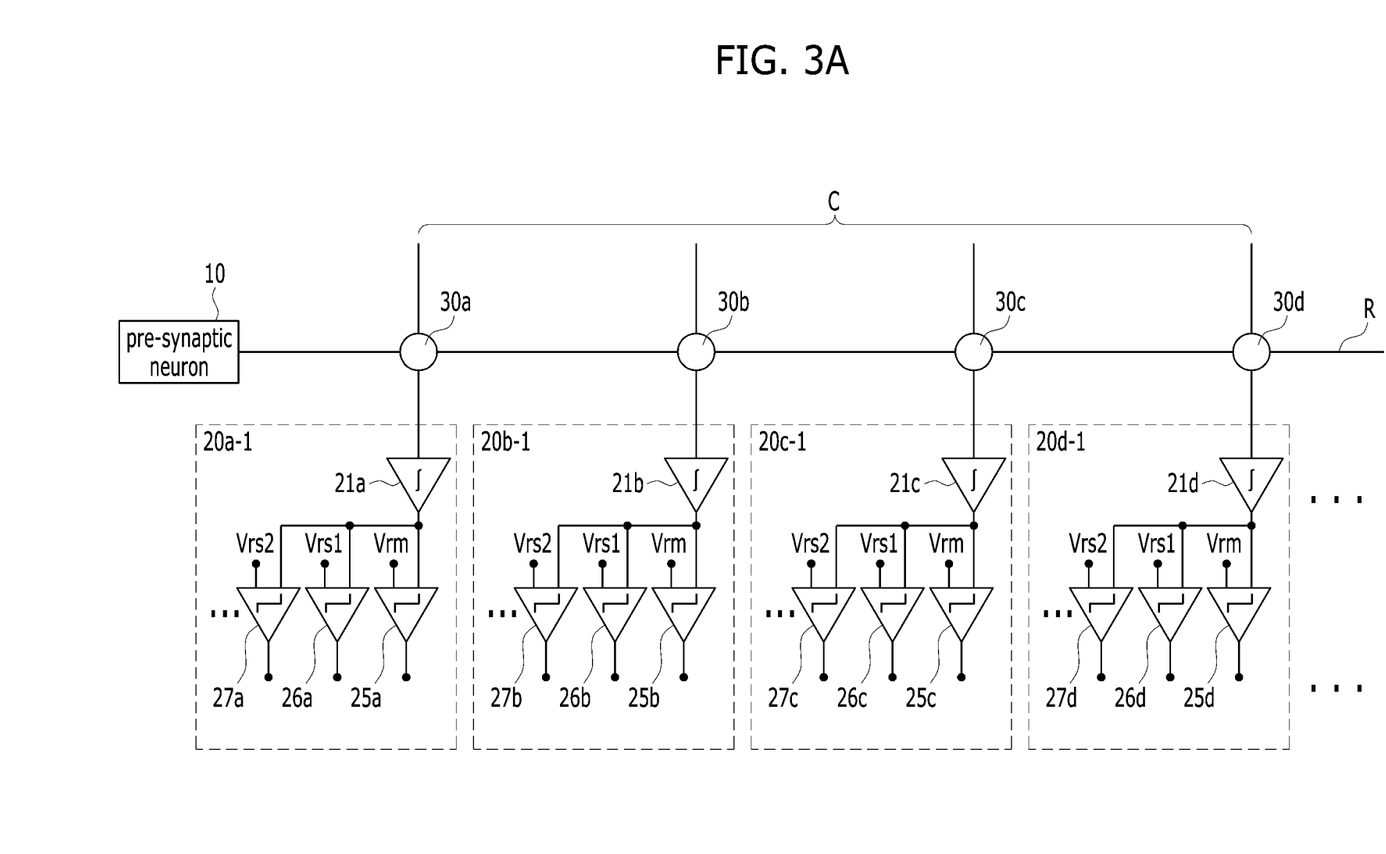
FIG. 3A is a block diagram conceptually illustrating a neuromorphic device in accordance with an embodiment.

FIG. 3A is a block diagram conceptually illustrating a neuromorphic device in accordance with an embodiment. Referring to FIG. 3A, each of post-synaptic neurons 20a-1 to 20d-1 of the neuromorphic device in accordance with the present embodiment may include one integrator, one main comparator, and two or more sub integrators. For illustrative convenience, FIG. 3A illustrates the post-synaptic neurons 20a-1 to 20d-1 that include the integrators 21a to 21d, the main comparators 25a to 25d, and the sub comparators 26a to 26d and 27a to 27d.

The integrators 21a to 21d may have output ports connected to first input ports, e.g., non-inverting input ports, of the respective comparators 25a to 25d, 26a to 26d, and 27a to 27d. A main reference voltage Vrm may be inputted to second input ports, e.g., inverting input ports, of the main comparators 25a to 25d; a first sub reference voltage Vrs1 may be inputted to second input ports, e.g., inverting input ports, of the upper sub comparators 26a to 26d; and a second sub reference voltage Vrs2 may be inputted to second input ports, e.g., inverting input ports, of the lower sub comparators 27a to 27d. The main reference voltage Vrm may have the highest voltage level, the second sub reference voltage Vrs2 may have the lowest voltage level, and the first sub reference voltage Vrs1 may be between the main reference voltage Vrm and the second sub reference voltage Vrs2.

When voltage levels of electrical signals outputted from the respective integrators 21a to 21d are lower than the second sub reference voltage Vrs2 while the synapses 30a to 30d are trained in a learning mode, the comparators 25a to 25d, 26a to 26d, and 27a to 27d may output no electrical signals. When no electrical signals are outputted from the comparators 25a to 25d, 26a to 26d, and 27a to 27d, a learning operation of the synapses 30a to 30d is incomplete. Thus, the learning operation of the synapses 30a to 30d may be continued.

When the voltage levels of the electrical signals outputted from the respective integrators 21a to 21d become lower than the first sub reference voltage Vrs1 and higher than the second sub reference voltage Vrs2 while the synapses 30a to 30d are trained in the learning mode, the lower sub comparators 27a to 27d may output electrical signals, and the main comparators 25a to 25d and the upper sub comparators 26a to 26d may still output no electrical signals. When no electrical signals are outputted from the main comparators 25a to 25d, the learning operation of the synapses 30a to 30d may be continued. The electrical signals outputted from the lower sub comparators 27a to 27d may be referred to as primary reset request signals.

When the voltage levels of the electrical signals outputted from the respective integrators 21a to 21d become lower than the main reference voltage Vrm and higher than the first sub reference voltage Vrs1 while the synapses 30a to 30d are trained in the learning mode, the upper sub comparators 26a to 26d and the lower sub comparators 27a to 27d may output electrical signals, and the main comparators 25a to 25d may still output no electrical signals. When electrical signals are outputted from one or more of the upper sub comparators 26a to 26d and/or the lower sub comparators 27a to 27d and no electrical signals are outputted from the main comparators 25a to 25d, the synapses 30a to 30d are being trained and the learning operation of the synapses 30a to 30d is not yet complete. Thus, the learning operation of the synapses 30a to 30d may be continued. The electrical signals outputted from the upper sub comparators 26a to 26d may be referred to as secondary reset request signals.

When a voltage level of an electrical signal outputted from one of the integrators 21a to 21d becomes higher than the main reference voltage Vrm while the synapses 30a to 30d are trained in the learning mode, one of the main comparators 25a to 25d may output an electrical signal. More specifically, when the electrical signal outputted from one of the integrators 21a to 21d becomes higher than the main reference voltage Vrm, a corresponding one of the post-synaptic neurons 20a to 20d may be fired. When the electrical signal is outputted from one of the main comparators 25a to 25d, the learning operation of the synapses 30a to 30d is completed. That is, when one of the post-synaptic neurons 20a to 20d is fired, the learning mode may be ended.

The electrical signals outputted from the sub comparators 26a to 26d and 27a to 27d may be used to reset or depress the synapses 30a to 30d. As described above, when electrical signals are outputted from the sub comparators 26a to 26d and 27a to 27d and no electrical signals are outputted from the main comparators 25a to 25d, the synapses 30a to 30d are quasi-trained. According to the present embodiment, the method for learning and/or resetting the synapses 30a to 30d may include depressing the quasi-trained synapses 30a to 30d by inputting a reset signal to the quasi-trained synapses 30a to 30d. Specifically, a primary reset process may be performed on the post-synaptic neurons 20a-1 to 20d-1 in which primary reset request signals are generated, and a secondary reset process may be performed on the post-synaptic neurons 20a-1 to 20d-1 in which secondary reset request signals are generated. The secondary reset request signals may be selectively generated from the post-synaptic neurons 20a-1 to 20d-1 in which the primary reset request signals are generated. For example, the post-synaptic neurons 20a-1 to 20d-1 connected to the weakly quasi-trained synapses 30a to 30d may generate the primary reset request signals without the secondary reset signals, and the post-synaptic neurons 20a-1 to 20d-1 connected to the dominantly quasi-trained synapses 30a to 30d may generate both the primary and secondary reset request signals. Therefore, the secondary reset request signals may not be generated by some of the post-synaptic neurons 20a-1 to 20d-1 that generate the primary reset request signals.

After the learning mode has ended, a reset mode may be performed to reset resistance values of the quasi-trained synapses 30a to 30d to initial resistance states. In the reset mode, the primary and secondary reset processes may be successively performed.

Figure 3B:
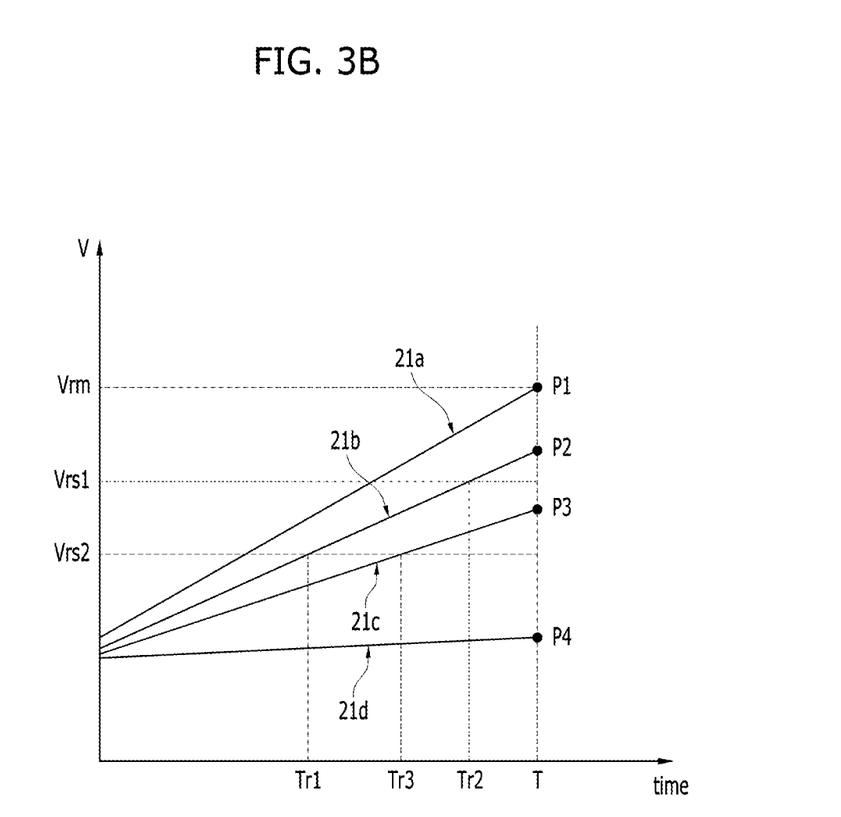
FIG. 3B is a graph conceptually illustrating changes in voltages of electrical signals outputted from integrators of post-synaptic neurons of FIG. 3A in the learning mode.

FIG. 3B is a graph conceptually illustrating changes in voltages of the electrical signals outputted from the integrators 21a to 21d of the post-synaptic neurons 20a-1 to 20d-1 of FIG. 3A in the learning mode. The following descriptions will be based on the supposition that the first synapse 30a is sufficiently trained, the second synapse 30b is dominantly quasi-trained, the third synapse 30c is weakly quasi-trained, and the fourth synapse 30d is not substantially trained.

FIG. 3B shows that, in the learning mode, an electrical signal outputted from the first integrator 21a of the first post-synaptic neuron 20a-1, an electrical signal outputted from the second integrator 21b of the second post-synaptic neuron 20b-1, an electrical signal outputted from the third integrator 21c of the third post-synaptic neuron 20c-1, and an electrical signal outputted from the fourth integrator 21d of the fourth post-synaptic neuron 20d-1 may have different voltage levels depending on the learning states of the synapses 30a to 30d.

Specifically, in the learning mode, a voltage level of the electrical signal outputted from the first integrator 21a of the first post-synaptic neuron 20a-1, a voltage level of the electrical signal outputted from the second integrator 21b of the second post-synaptic neuron 20b-1, a voltage level of the electrical signal outputted from the third integrator 21c of the third post-synaptic neuron 20c-1, and a voltage level of the electrical signal outputted from the fourth integrator 21d of the fourth post-synaptic neuron 20d-1 may gradually increase, as illustrated in the graph of FIG. 3B.

At a learning completion time T where the learning of the first synapse 30a is completed, the first integrator 21a connected to the first synapse 30a may output an electrical signal having a voltage level (refer to P1 in FIG. 3B) that is equal to or higher than the main reference voltage Vrm, the second integrator 21b connected to the dominantly quasi-trained second synapse 30b may output an electrical signal having a voltage level (refer to P2 in FIG. 3B) higher than the first sub reference voltage Vrs1 and lower than the main reference voltage Vrm, the third integrator 21c connected to the weakly quasi-trained third synapse 30c may output an electrical signal having a voltage level (refer to P2 in FIG. 3B) higher than the second sub reference voltage Vrs2 and lower than the first sub reference voltage Vrs1, and the fourth integrator 21d connected to the fourth synapse 30d may output an electrical signal having a voltage level (refer to P4 in FIG. 3B) lower than the second sub reference voltage Vrs2.

When the first integrator 21a of the first post-synaptic neuron 20a-1 connected to the sufficiently trained first synapse 30a outputs the electrical signal having the voltage level that is higher than the main reference voltage Vrm, the first post-synaptic neuron 20a-1 may be fired by an output of the first main comparator 25a. That is, when the first post-synaptic neuron 20a-1 is fired, the learning mode may be ended.

The second lower sub comparator 27b may output the primary reset request signal at a primary reference time Tr1 when the voltage level of the electrical signal outputted from the second integrator 21b becomes higher than the second sub reference voltage Vrs2, and the second upper sub comparator 26b may output the secondary reset request signal at a secondary reference time Tr2 when the voltage level of the electrical signal outputted from the second integrator 21b becomes higher than the first sub reference voltage Vrs1. At these reference times Tr1 and Tr2, since the voltage level of the electrical signal outputted from the second integrator 21b does not become higher than the main reference voltage Vrm, the second main comparator 25b may output no electrical signal.

At a third reference time Tr3 when the voltage level of the electrical signal outputted from the third integrator 21c becomes higher than the second sub reference voltage Vrs2, the third lower sub comparator 27c may output the primary reset request signal. At this reference time Tr3, since the voltage level of the electrical signal outputted from the third integrator 21c does not become higher than the main reference voltage Vrm and the first reference voltage Vrs1, the third main comparator 25c and the third upper sub comparator 26c may output no electrical signals.

At the above reference times Tr1, Tr2, Tr3, and T, since the voltage level outputted from the fourth integrator 21d does not become higher than the second sub reference voltage Vrs2, the fourth main comparator 25d, the fourth upper sub comparator 26d, and the fourth lower sub comparator 27d may output no electrical signals.

After the learning mode has ended at the learning completion time T, a reset mode may be performed. The reset mode may include a reset process of initializing the dominantly quasi-trained second synapse 30b and/or the weakly quasi-trained third synapse 30c.

Since a learning completion signal is generated from the first post-synaptic neuron 20a-1 when the learning mode has ended, the first synapse 30a coupled to the first post-synaptic neuron 20a-1 may be determined to be trained. Thus, the reset request signals generated from the first post-synaptic neuron 20a-1 may be ignored, and a reset process for depressing or resetting the first synapse 30a may not be performed.

Since a learning completion signal is not generated from the second post-synaptic neuron 20b-1 and instead two reset request signals are generated during the learning mode, the second synapse 30b coupled to the second post-synaptic neuron 20b-1 may be determined to be dominantly quasi-trained. Therefore, reset processes for dominantly depressing or resetting the second synapse 30b may be performed. For example, the dominantly quasi-trained second synapse 30b may be depressed or reset through two reset processes.

Since a learning completion signal is not generated from the third post-synaptic neuron 20c-1 and instead one reset request signal is generated during the learning mode, the third synapse 30c coupled to the third post-synaptic neuron 20c-1 may be determined to be weakly quasi-trained. Therefore, a reset process for weakly depressing or resetting the third synapse 30c may be performed. For example, the weakly quasi-trained third synapse 30c may be depressed or reset through one reset process.

Since a learning termination signal and a reset request signal are not generated from the fourth post-synaptic neuron 20d-1 during the learning mode, the fourth synapse 30d coupled to the fourth post-synaptic neuron 20d-1 may be determined to not be substantially trained. Thus, a reset process for depressing or resetting the fourth synapse 30d may not be performed.

According to another embodiment, the post-synaptic neurons 20a-1 to 20d-1 may include three or more sub comparators. That is, learning states of the synapses 30a to 30d may be precisely classified through a plurality of sub reference voltages, and a plurality of reset processes may be performed.

Figure 4:
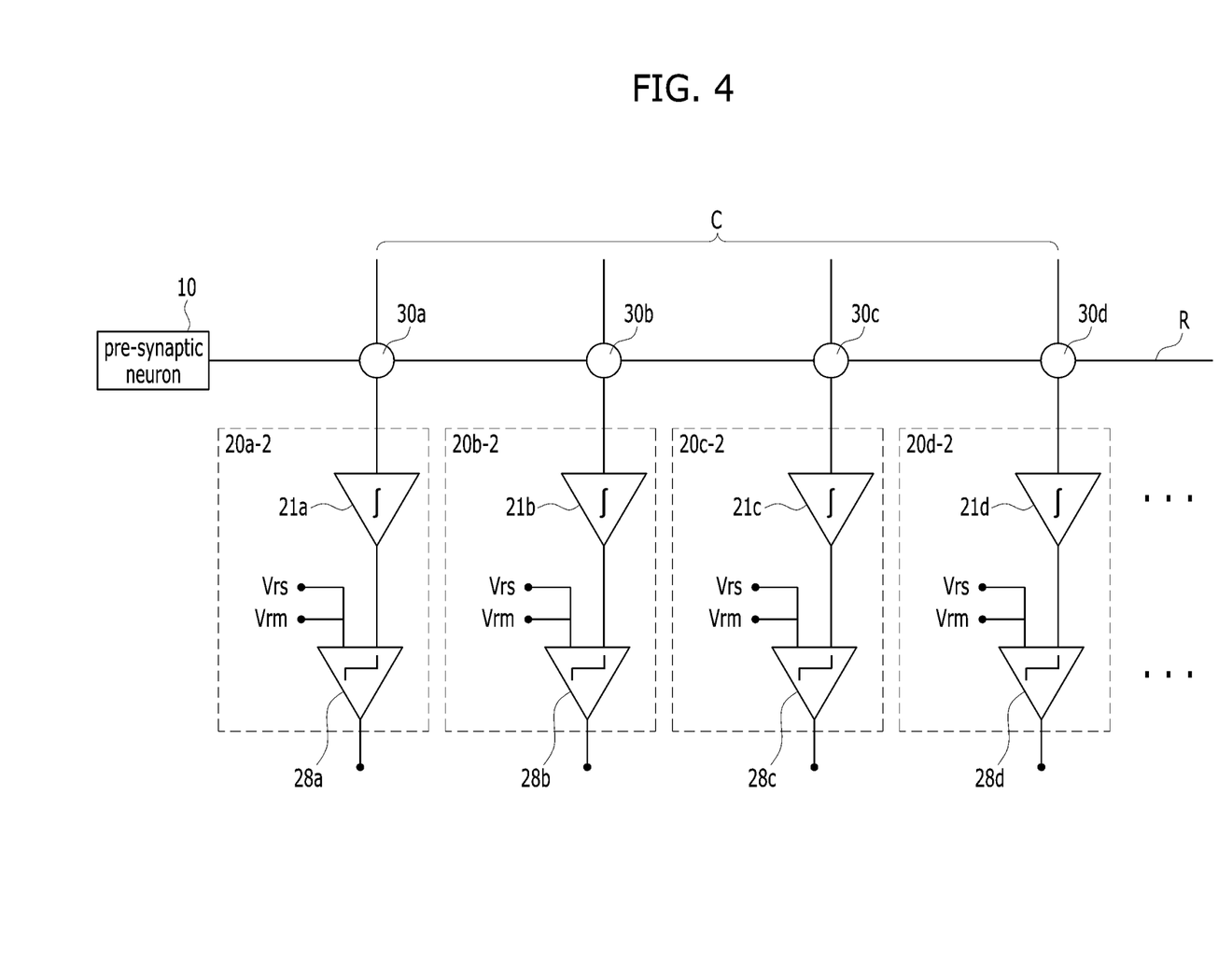
FIG. 4 is a block diagram conceptually illustrating a neuromorphic device in accordance with an embodiment.

FIG. 4 is a block diagram conceptually illustrating a neuromorphic device in accordance with an embodiment. Referring to FIG. 4, each of post-synaptic neurons 20a-2 to 20d-2 of the neuromorphic device in accordance with the present embodiment may include one integrator and one comparator.

Each of the comparators 28a to 28d may receive a main reference voltage Vrm and a sub reference voltage Vrs through an inverting input port thereof. For example, in a learning mode, the sub reference voltage Vrs and the main reference voltage Vrm may be inputted to the inverting input port of each of the comparators 28a to 28d until the post-synaptic neurons 20a-2 to 20d-2 are fired, while the synapses 30a to 30d are trained. The sub reference voltage Vrs may be lower than the main reference voltage Vrm.

Specifically, while the synapses 30a to 30d are trained, outputs of the integrators 21a to 21d may be inputted to non-inverting input ports of the comparators 28a to 28d, respectively, and the sub reference voltage Vrs may be inputted to the inverting input ports of the comparators 28a to 28d. When the outputs of the integrators 21a to 21d become higher than the sub reference voltage Vrs, the comparators 28a to 28d may output reset request signals. When the reset request signals are outputted, the main reference voltage Vrm may be inputted to the inverting input ports of the comparators 28a to 28d. When the outputs of the integrators 21a to 21d become higher than the main reference voltage Vrm, the comparators 28a to 28d may output learning completion signals. Thus, the synaptic neurons 20a-2 to 20d-2 may be fired, and the learning mode may be ended.

When the learning mode has ended, a reset mode may be performed. In the reset mode, the synapses 30a to 30d connected to the post-synaptic neurons 20a-2 to 20d-2, respectively, having outputted the reset request signals may be depressed or reset. However, in the reset mode, the reset request signal outputted from a fired post-synaptic neuron may be ignored, and thus a synapse connected to the fired post-synaptic neuron is not depressed or reset.

According to the embodiment described with reference to FIGS. 3A and 3B, the sub reference voltage Vrs may have two or more voltage levels, e.g., Vrs1 and Vrs2.

Figure 5A:
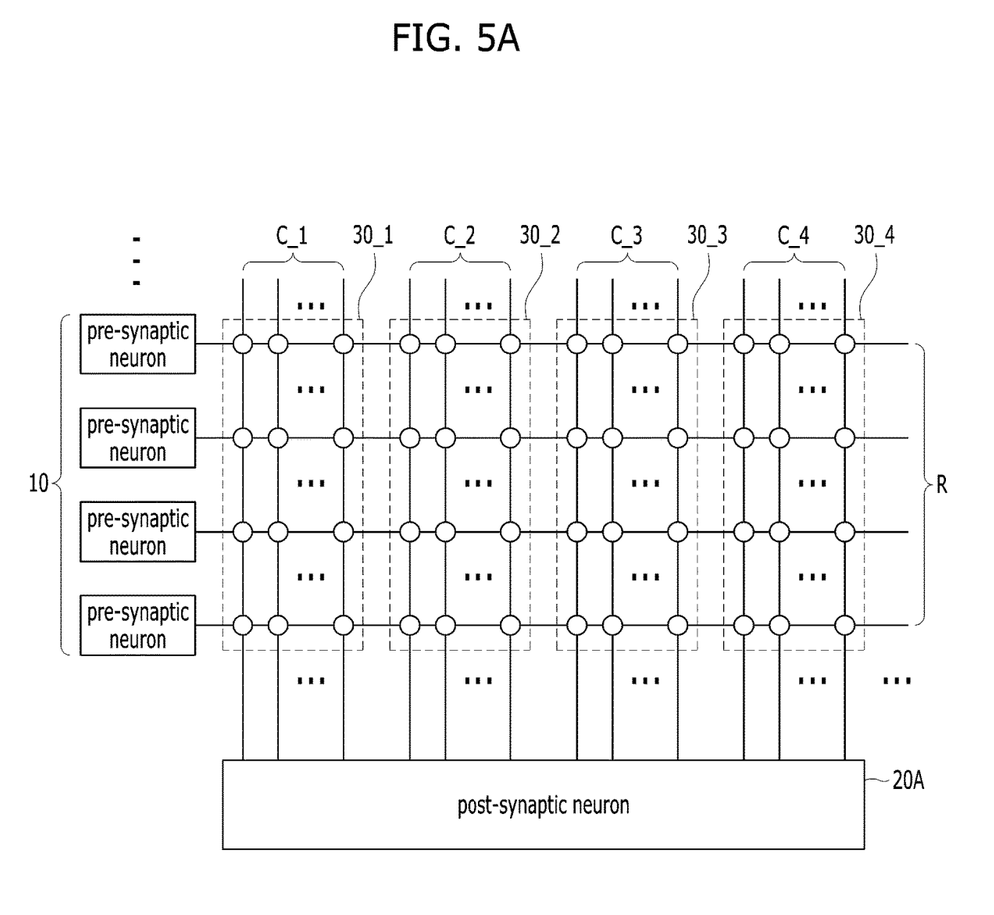
FIG. 5A is a block diagram conceptually illustrating a neuromorphic device in accordance with an embodiment.
Figure 5B:
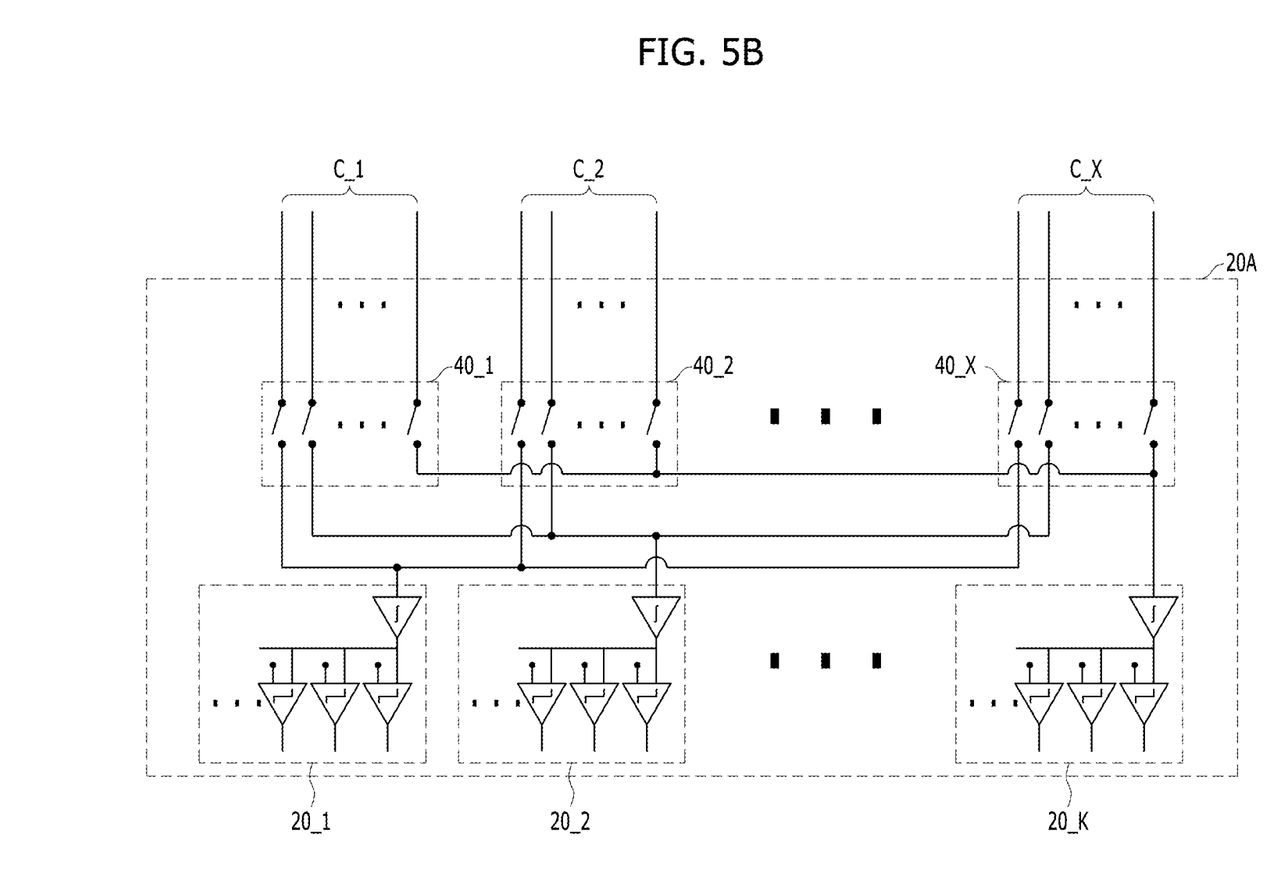
FIG. 5B is a block diagram conceptually illustrating post-synaptic neurons in accordance with an embodiment.

FIG. 5A is a block diagram conceptually illustrating a neuromorphic device in accordance with an embodiment, and FIG. 5B is a block diagram conceptually illustrating a post-synaptic neuron 20A in detail. Referring to FIG. 5A, the neuromorphic device in accordance with the present embodiment may include a plurality of pre-synaptic neurons 10, synapse bundles 30_1 to 30_4, and one common post-synaptic neuron 20A.

The synapse bundles 30_1 to 30_4 may include synapses which are separated and bundled according to a plurality of column line bundles C_1 to C_4. Each of the column line bundles C_1 to C_4 may have a plurality of column lines. The plurality of synapse bundles 30_1 to 30_4 and the plurality of column line bundles C_1 to C_4 may share the common post-synaptic neuron 20A.

Referring to FIG. 5B, the common post-synaptic neuron 20A may include a plurality of internal post-synaptic neurons 20_1 to 20_K and switches 40_1 to 40_X, K and X being positive integers. The internal post-synaptic neurons 20_1 to 20_K may be understood with reference to the post-synaptic neurons 20a to 20d or 20a-1 to 20d-1 illustrated in FIG. 2A or 3A, respectively. The switches 40_1 to 40_X may control the connection between the column line bundles C_1 to C_X coupled to the synapse bundles 30_1 to 30_4 and the plurality of internal post-synaptic neurons 20_1 to 20_K. That is, the column lines C may be exclusively connected to the common post-synaptic neuron 20A on a bundle basis, and independently connected to the internal post-synaptic neurons 20_1 to 20_K. Each of the switches 40_1 to 40_X may include K transistors having a common gate electrode. Specifically, each of the switches 40_1 to 40_X may select a corresponding one of the column line bundles C_1 to C_X according to a common bundle select signal provided to the common gate electrode, and exclusively connect the selected column line bundle to the internal post-synaptic neurons 20_1 to 20_K. In the embodiment illustrated in FIG. 5B, the number of internal post-synaptic neurons 20_1 to 20_K is the same as the number of transistors in each of the switches 40_1 to 40_X.

Figure 6A:
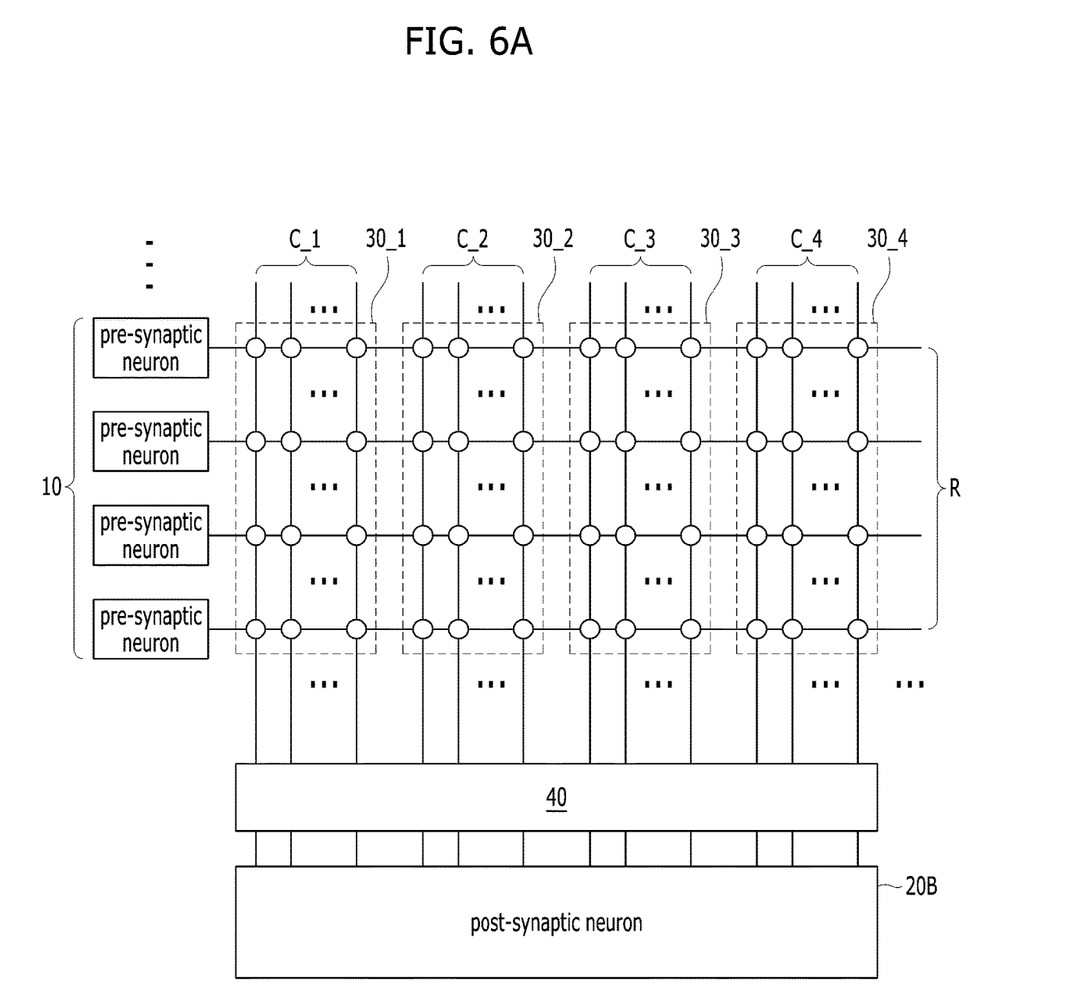
FIG. 6A is a block diagram conceptually illustrating a neuromorphic device in accordance with an embodiment.
Figure 6B:
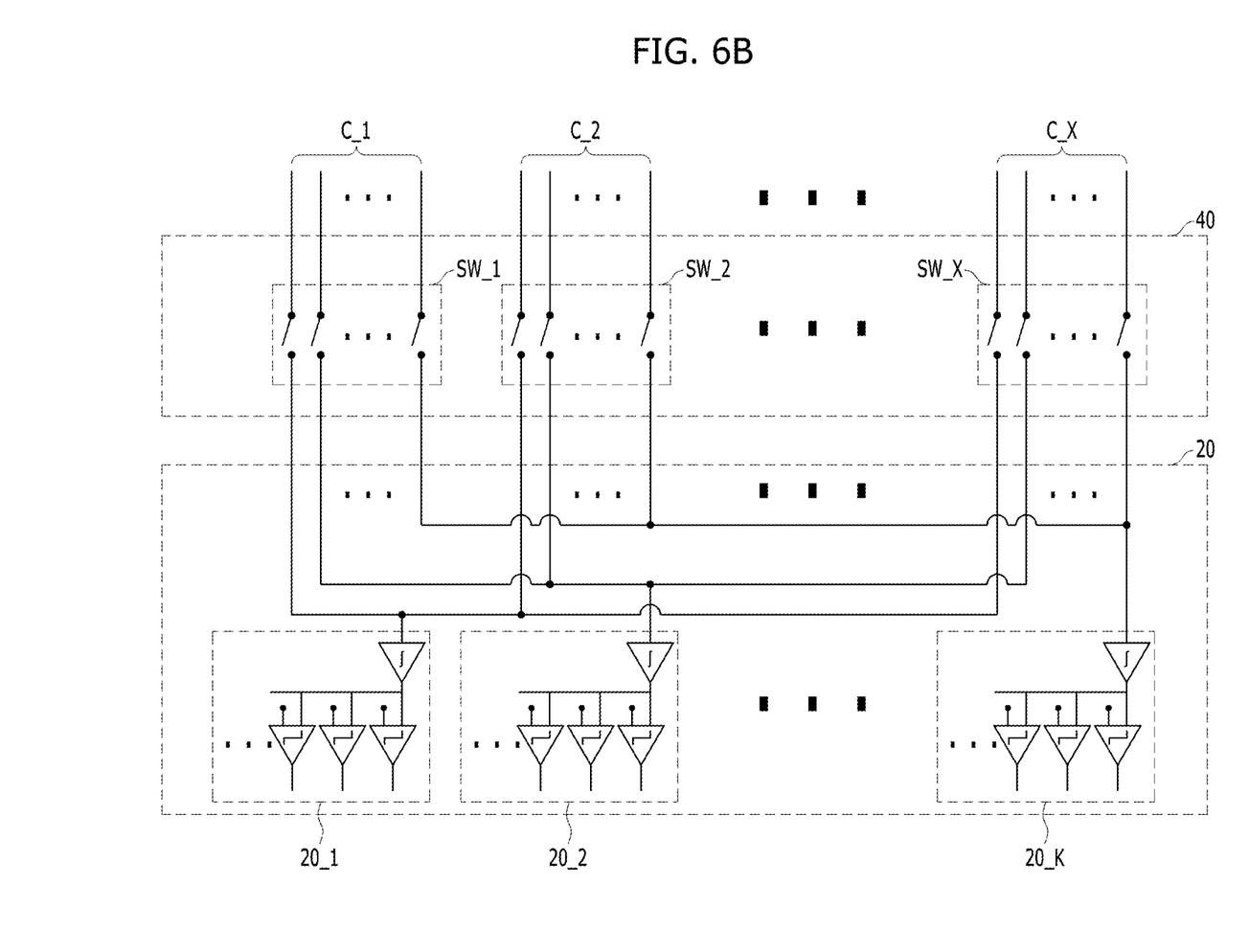
FIG. 6B is a block diagram conceptually illustrating post-synaptic neurons and a switch block in accordance with an embodiment.

FIG. 6A is a block diagram conceptually illustrating a neuromorphic device in accordance with an embodiment, and FIG. 6B is a block diagram conceptually illustrating a post-synaptic neuron 20B and a switch block 40 in detail. Referring to FIG. 6A, the neuromorphic device in accordance with the present embodiment may include a plurality of pre-synaptic neurons 10, a plurality of synapses 30, a switch block 40, and a common post-synaptic neuron 20B. The plurality of synapses 30 may share the common post-synaptic neuron 20B through the switch block 40. Referring to FIG. 6B, the switch block 40 may include a plurality of switches SW_1 to SW_X. Operations of the switches SW_1 to SW_X may be understood with reference to FIG. 5B.

Figure 7:
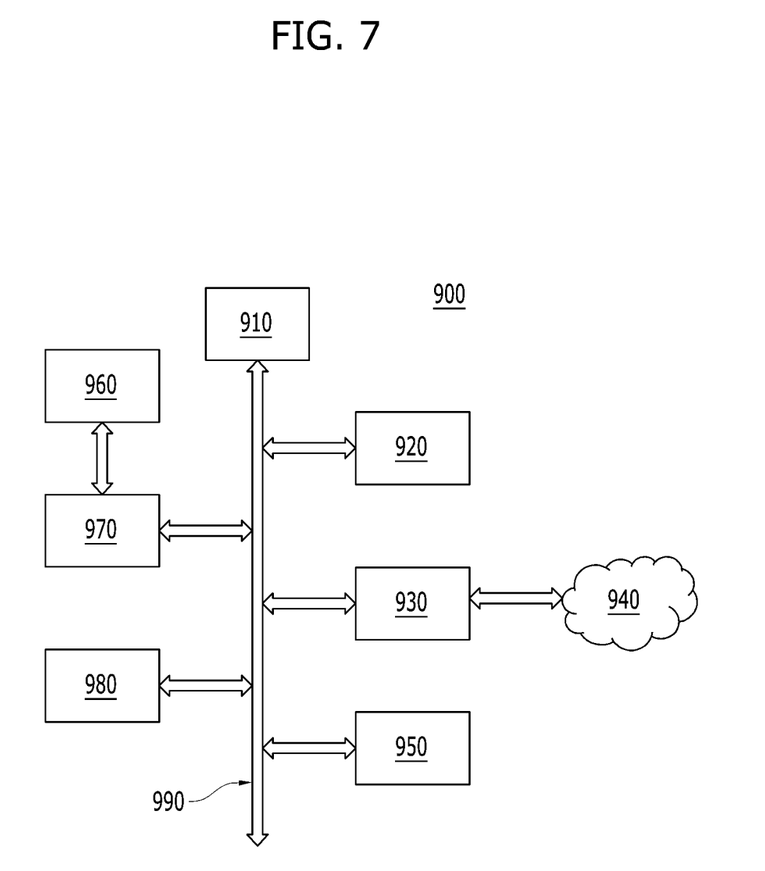
FIG. 7 is a block diagram conceptually illustrating a pattern recognition system in accordance with an embodiment.

FIG. 7 is a block diagram conceptually illustrating a pattern recognition system 900 in accordance with an embodiment. For example, the pattern recognition system 900 may include one of a speech recognition system, an image recognition system, a code recognition system, a signal recognition system, and a system for recognizing various patterns.

Referring to FIG. 7, the pattern recognition system 900 in accordance with the present embodiment may include a central processing unit (CPU) 910, a memory unit 920, a communication control unit 930, a network 940, an output unit 950, an input unit 960, an analog-digital converter (ADC) 970, a neuromorphic unit 980, and a bus 990. The CPU 910 may generate and transmit various signals for a learning process by the neuromorphic unit 980, and perform a variety of processes and functions for recognizing patterns such as voices and images according to an output of the neuromorphic unit 980.

The CPU 910 may be connected to the memory unit 920, the communication control unit 930, the output unit 950, the ADC 970, and the neuromorphic unit 980 through the bus 990.

The memory unit 920 may store various information in accordance with operations of the pattern recognition system 900. The memory unit 920 may include one or more of a volatile memory device such as DRAM or SRAM, a non-volatile memory device such as PRAM, MRAM, ReRAM, or NAND flash memory, and a memory unit such as a HDD (Hard Disk Drive) or a SSD (Solid State Drive).

The communication control unit 930 may transmit and/or receive data such as a recognized voice and image to and/or from a communication control unit of another system through the network 940.

The output unit 950 may output the data such as the recognized voice and image using various methods. For example, the output unit 950 may include one or more of various output devices including a speaker, printer, monitor, display panel, beam projector, hologrammer, and so on.

The input unit 960 may include one or more of a microphone, a camera, a scanner, a touch pad, a keyboard, a mouse, a mouse pen, a sensor, and so on.

The ADC 970 may convert analog data transmitted from the input unit 960 into digital data.

The neuromorphic unit 980 may perform learning and recognition using the data transmitted from the ADC 970, and output data corresponding to a recognized pattern. The neuromorphic unit 980 may include one or more of the neuromorphic devices in accordance with the various embodiments.

In accordance with the present embodiment, since the quasi-trained synapses can be decided and reset, the operation of the neuromorphic device can be stabilized.

Since the quasi-trained synapses can be reset, the synapse utilization efficiency can be improved.

The learning efficiency of the synapses can be improved.

Although various embodiments have been described for illustrative purposes, it will be apparent to those skilled in the art that various changes and modifications may be made without departing from the spirit and scope of the invention as defined in the following claims.

What is claimed is:

1. A neuromorphic device comprising:
   a pre-synaptic neuron;
   a plurality of post-synaptic neurons; and
   a plurality of synapses electrically connected to the pre-synaptic neuron and electrically connected to the plurality of post-synaptic neurons,
   wherein each of the post-synaptic neurons comprises:
      an integrator;
      a main comparator having a first input port connected to an output port of the integrator and a second input port receiving a main reference voltage;
      a first sub comparator having a first input port connected to the output port of the integrator and a second input port receiving a first sub reference voltage; and
      a second sub comparator having a first input port connected to the output port of the integrator and a second input port receiving a second sub reference voltage.

2. The neuromorphic device of claim 1, wherein the main reference voltage has a higher voltage level than the first and second sub reference voltage levels, and
   wherein the second sub reference voltage has a lower voltage level than the first sub reference voltage level.

3. The neuromorphic device of claim 1, wherein the first input ports of the main comparator, the first sub comparator, and the second sub comparator are non-inverting input ports, and
wherein the second input ports of the main comparator, the first sub comparator, and the second sub comparator are inverting input ports.

4. The neuromorphic device of claim 1, wherein the output port of the integrator, the first input port of the main comparator, and the first input port of the first sub comparator are directly connected to each other.

5. The neuromorphic device of claim 1, wherein input ports of the integrators of the plurality of post-synaptic neurons are electrically connected to the plurality of synapses, respectively.

6. The neuromorphic device of claim 1, further comprising a switch block disposed between the plurality of post-synaptic neurons and the plurality of synapses.

7. The neuromorphic device of claim 6, wherein the switch block comprises a plurality of switches,
wherein the plurality of synapses are grouped into a plurality of column line bundles, and
wherein the plurality of switches electrically connects or disconnects a corresponding one of the column line bundles to or from the integrators of the plurality of post-synaptic neurons.

8. A neuromorphic device comprising:
a pre-synaptic neuron;
a row line electrically connected to the pre-synaptic neuron;
a plurality of post-synaptic neurons;
a plurality of column lines electrically connected to the plurality of post-synaptic neurons, respectively; and
a plurality of synapses arranged at intersections between the row line and the plurality of column lines,
wherein each of the plurality of post-synaptic neurons comprises:
an integrator; and
a comparator having a first input port connected to an output port of the integrator,
wherein the comparator has a second input port to which a main reference voltage and a sub reference voltage are inputted, the sub reference voltage having a lower voltage level than the main reference voltage level.

9. The neuromorphic device of claim 8, wherein the sub reference voltage has two or more different voltage levels.

10. The neuromorphic device of claim 8, wherein the integrators of the plurality of post-synaptic neurons comprise input ports electrically connected to the plurality of synapses, respectively.

* * * * *